July 3, 1962 T. A. LJUNGBERG 3,042,338
MEASURING TOOLS
Filed Feb. 16, 1960
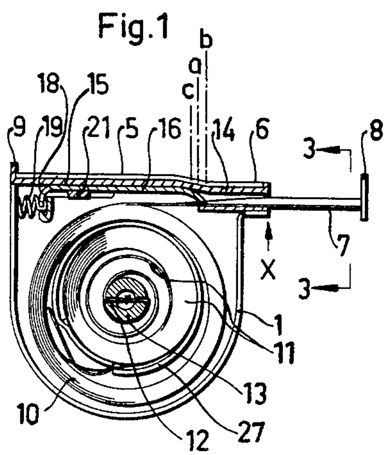
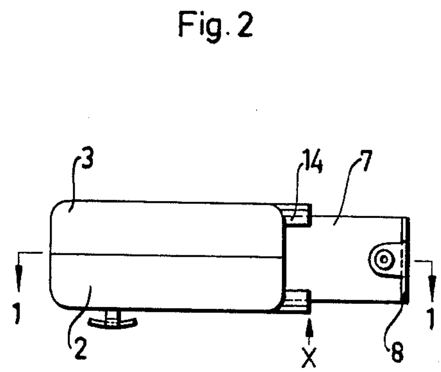
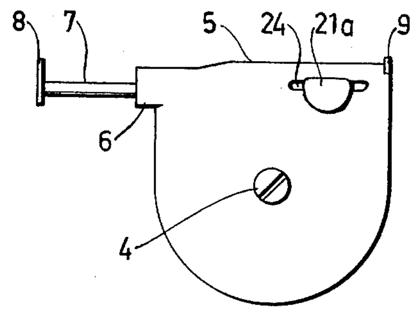
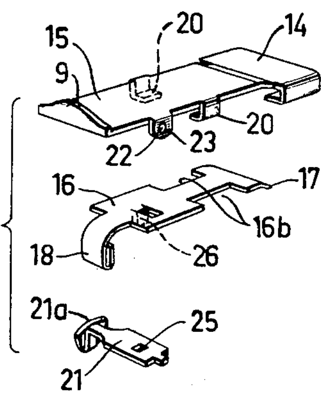
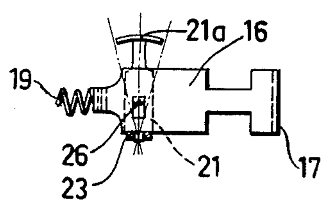
INVENTOR
TURE ANDERS LJUNGBERG
BY Irwin S. Thompson
ATTY.

United States Patent Office 3,042,338

Patented July 3, 1962

3,042,338

MEASURING TOOLS

Ture Anders Ljungberg, Badstigen 6, Stuvsta, Sweden

Filed Feb. 16, 1960, Ser. No. 9,115
4 Claims. (Cl. 242—107.2)

The pesent invention relates to an improvement in measuring tools of the type in which a steel measuring tape of arcuate cross-section is arranged in the form of a roll within a case from which the tape is withdrawable through a channel-shaped guide and is positionable against displacement by a locking element adapted, by flattening the arcuate cross-section of the tape, to cause the edges of the tape to be forced into engagement with the lateral edges of the channel-shaped guide.

In hitherto known measuring tools of this kind, the element effecting the flattening of the cross-section of the tape consisted in an angularly movable guide through which the tape runs and which was acted on by a rod spring extending substantially at right angles to the tape and, in the locking position, urging the convex face of the tape disposed in the mouth portion against a rivet head or the like. The locking action was disabled by subjecting the rod spring to a lateral pressure by means of a button attached to the spring thus causing bending and shortening of the effective spring length thus removing the spring pressure and enabling the tape to resume its normal arcuate cross-sectional configuration.

The present invention has for its object to replace this arrangement by a simpler and cheaper arrangement in which, in addition, no harmful fatigue phenomena of springs can occur.

According to the mainly characterising feature of the invention, the locking element consists in a slide disposed within the case and displaceable into the guide, the displacement of the slide into the guide effecting the flattening of the tape configuration involving the locating action.

In order to elucidate the invention, reference is made to an embodiment thereof illustrated by way of example in the accompanying drawing, in which:

FIG. 1 shows a longitudinal section through the measuring tool of the invention, as taken along the line 1—1 in FIG. 2;

FIG. 2 is a plan view of the measuring tool of FIG. 1;

FIG. 3 is a cross section taken along the lint 3—3 in FIG. 1;

FIG. 4 is a side view of the measuring tool;

FIG. 5 is an exploded perspective view of a guide for the steel measuring tape, a slide co-operating therewith, and a lever serving for causing displacement of the slide; and FIG. 6 is a plan view of the slide and the lever co-operating therewith.

Referring to the drawing, numeral 1 designates the case which consists of two halves 2 and 3, being, for instance, sheet-metal stampings, and interconnected by a screw 4. The case 1 is circular in shape but has a flat top wall 5 which has a mouth-piece extension 6 through which the steel measuring tape 7 can be withdrawn. The measuring tape is provided at its extreme outer end with a transversely extending end lug 8, a similar end lug 9 being attached to the rear end of the flat case part 5. Between these transversely projecting lugs 8 and 9 the measurements are made, the scale of the measuring tape being, preferably, graduated in accordance therewith so as to enable the correct measure to be read at the position X where the tape emerges from the mouth-piece extension.

Within the case the steel measuring tape 7 is coiled up in the form of a roll 10 on a reel 27 acted on in its turn by a helical spring 11 having its inner end inserted into a slot 12 formed in a boss 13 projecting from one case half 2 and tending to retract the measuring tape into the case.

Inserted into the mouth-piece portion 6 is a channel-shaped guide 14 for the measuring tape 7, said guide being extended by a strip-shaped portion 15 engaging the flat top wall 5 of the case.

The steel measuring tape 7 is arcuate in cross section, as shown in FIG. 3, and is intended to be located within the guide 14 by flattening the arcuate tape-profile, whereby the lateral edges of the tape are forced into engagement with the lateral walls of the guide. In the drawing, the convex surface of the tape 7 is assumed to face upwards, it being possible also, however, to let the concave surface thereof face upwards.

For locking the measuring tape 7, there is disposed above the latter a slide 16 made of thin sheet steel and engaging the strip-shaped portion 15 and having suitably a slightly downwardly bent front end 17, the rear end 18 of the slide being bent over at right angles and carrying a coil spring 19 engaging the inner surface of the case 1 and urging the slide forwardly (to the right in FIG. 1).

The slide 16 which, in order to obtain an appropriate resiliency, may be formed with a pair of lateral recesses *16b*, *16b* towards its front end, is suitably adapted to slide in bent-over guide lugs 20 (FIG. 5) depending from the strip-shaped portion 15 and is displaceable by the aid of a lever 21 having one end thereof pivoted in a hole 22 formed in a lug 23 bent down from the strip-shaped portion 15, its other end projecting out through a slot 24 in one case half 2 and being provided with a head *21a*. The lever 21 is formed between its ends with an aperture 25 which is engaged by a pin 26 punched out from the slide and bent down.

In FIG. 1, the slide 16 is shown in an intermediate position in which it is normally held by the spring 19. In this intermediate position its curved front end 17 projects into the channel-shaped guide 14 above the measuring tape 7 and causes a slight flattening of the arcuate tape profile, whereby the tape is frictionally held in various extracted positions, but is not securely located so that the same can be withdrawn from, or pushed into, the case by exerting a certain force on it.

From said position, in which the front end 17 of the slide reaches as far as the line *a* in FIG. 1, the slide can be displaced by actuating the lever 21 to the position *b*, i.e. it can be moved further into the guide 14, which causes a substantial flattening of the tape profile to take place so that, by applying its edges forcefully against the lateral walls of the guide, the tape will be securely located against displacement in the guide. In so doing, the tape is applied against the bottom surface of the guide 14, whereby the reading at X will be free from parallax. Furthermore, the slide can be moved rearwardly against the action of the spring 19 so as to place its front end flush with the line *c*, in which position the tape 7 is neither braked nor locked, but is allowed to slide freely within the guide 14 to be coiled up within the case 1 by the return spring 11.

Various modifications of the arrangement are, of course, conceivable within the scope of the claims.

What I claim is:

1. A measuring tool comprising a casing having a mouth portion, a flexible measuring tape having a concavo-convex profile coiled within said casing, a channel-shaped guide member having side walls fixedly mounted in said mouth portion, said guide member having a width slightly smaller than the width of said measuring tape when flattened, said measuring tape being freely slidable in and extending through said guide member when said measuring tape is in said concavo-convex profile, a locking means for said measuring tape consisting of a slide member having a wedging portion, guide lugs mounted on said guide member for mounting said slide member therein, said slide member being movable in said guide member in the direction of the length of said measuring tape from a first position in which said measuring tape has said concavo-convex profile and is freely slidable in said guide member to a second position in which said wedging portion of said slide member wedges the profile of said measuring tape to a flattened position thereby urging the edges of said measuring tape against said side walls of said guide member to effectively lock said measuring tape in said guide member, and a manually operable mechanism for moving said slide member between said first and second positions.

2. A measuring tool comprising a casing having a mouth portion, a flexible measuring tape having a concavo-convex profile coiled within said casing, a channel-shaped guide member having side walls fixedly mounted in said mouth portion, said guide member having a width slightly smaller than the width of said measuring tape when flattened, said measuring tape being freely slidable in and extending through said guide member when said measuring tape is in said concavo-convex profile, a locking means for said measuring tape consisting of a slide member having a wedging portion, guide lugs mounted on said guide member for mounting said slide member therein, said slide member being movable in said guide member in the direction of the length of said measuring tape from a first position in which said measuring tape has said concavo-convex profile and is freely slidable in said guide member to a second position in which said wedging portion of said slide member wedges the profile of said measuring tape to a flattened position thereby urging the edges of said measuring tape against said side walls of said guide member to effectively lock said measuring tape in said guide member, a spring mounted between said casing and said slide member to maintain said slide member in a third position intermediate said first and second positions wherein said measuring tape is frictionally held in various extended positions but unlocked in said guide member, and a manually operable mechanism for moving said slide member between said first and second positions.

3. A measuring tool as claimed in claim 2 wherein said slide member is in the form of a metal strip and said wedging portion thereof consists of the forward end of said slide member being bent toward said measuring tape.

4. A measuring tool as claimed in claim 1, wherein said manually operable mechanism for moving the slide member comprises a lever pivoted at one end in a stationary support in said casing, its other end projecting through a slot in the casing, and the lever being connected to the slide member at a point intermediate its ends.

References Cited in the file of this patent

UNITED STATES PATENTS

| | | |
|---|---|---|
| 2,549,098 | Joseph | Apr. 17, 1951 |
| 2,599,320 | Dart | June 3, 1952 |
| 2,684,534 | Ljungberg | July 27, 1954 |